(12) United States Patent
Munaux

(10) Patent No.: US 9,481,135 B2
(45) Date of Patent: Nov. 1, 2016

(54) METHOD FOR DEFINING FIBER TRAJECTORIES FROM A TRANSFER SURFACE

(71) Applicant: CORIOLIS SOFTWARE, Queven (FR)

(72) Inventor: Olivier Munaux, Ploemeur (FR)

(73) Assignee: CORIOLIS SOFTWARE, Queven (FR)

( * ) Notice: Subject to any disclaimer, the term of this patent is extended or adjusted under 35 U.S.C. 154(b) by 0 days.

(21) Appl. No.: 14/893,310

(22) PCT Filed: May 20, 2014

(86) PCT No.: PCT/FR2014/000108
§ 371 (c)(1),
(2) Date: Nov. 23, 2015

(87) PCT Pub. No.: WO2014/188084
PCT Pub. Date: Nov. 27, 2014

(65) Prior Publication Data
US 2016/0082672 A1      Mar. 24, 2016

(30) Foreign Application Priority Data

May 22, 2013   (FR) ...................................... 13 01172

(51) Int. Cl.
*B29C 70/30*   (2006.01)
*B32B 37/16*   (2006.01)
*G05B 19/4097* (2006.01)
*B32B 37/00*   (2006.01)
*B29C 70/34*   (2006.01)
*B32B 37/02*   (2006.01)

(52) U.S. Cl.
CPC ............. *B29C 70/30* (2013.01); *B32B 37/025* (2013.01); *G05B 19/4097* (2013.01); *G05B 2219/45238* (2013.01)

(58) Field of Classification Search
CPC .............. B29C 70/30; G05B 19/4097; G05B 2219/45238; B32B 37/025
See application file for complete search history.

(56) References Cited

U.S. PATENT DOCUMENTS 4,696,707 A * 9/1987 Lewis ................... B29C 70/386
                                                    156/350
5,041,179 A    8/1991 Shinno et al.
(Continued)

OTHER PUBLICATIONS

PCT International Search Report for PCT/FR2014/000108, mailed Oct. 21, 2014, 4 pgs.

*Primary Examiner* — Sonya Mazumdar
(74) *Attorney, Agent, or Firm* — Patterson Thuente Pedersen, P.A.

(57) ABSTRACT

A method for defining trajectories of fiber on a layup surface, including the definition of a transfer mesh of a transfer surface corresponding to a simplified surface, substantially continuous, of the layup surface, the direction of a fiber at an analysis point of the layup surface, being obtained by:
- definition of a projected point by normal projection of an analysis point on the transfer mesh,
- definition of a reference direction at said projected point,
- definition of the normal to the transfer element,
- definition of a cutting plane by the projected point, the reference direction and the normal,
- definition of the line of intersection of the cutting plane with the plane of the element, the direction of the fiber at the analysis point being obtained from this line of intersection.

2 Claims, 15 Drawing Sheets

(56) References Cited

U.S. PATENT DOCUMENTS

| | | | |
|---|---|---|---|
| 2010/0136293 A1* | 6/2010 | Kubryk | B29C 70/202 428/156 |
| 2016/0121557 A1* | 5/2016 | Munaux | B29C 70/382 700/98 |
| 2016/0121558 A1* | 5/2016 | Munaux | B29C 70/382 700/97 |

* cited by examiner

METHOD FOR DEFINING FIBER TRAJECTORIES FROM A TRANSFER SURFACE

RELATED CASES

The present application is a National Phase entry of PCT Application No. PCT/FR2014/000108, filed May 20, 2014, which claims priority from FR Patent Application No. 1301172, filed May 22, 2013, which applications are hereby incorporated by reference in their entireties.

TECHNICAL FIELD

The present invention relates to the manufacture of parts made of composite material by automatic fiber layup machines, and more particularly to a method of defining fiber trajectories on a layup surface for automatic layup machines.

BACKGROUND ART

There are known composite material parts produced by methods called fiber placement, by superposing several plies of fiber in different directions. In this document, the term "fiber placement" refers to the placement of tows, in which each ply is made by laying up in contact on a mold of bands side by side, each band being formed of several independent tows arranged side by side, and the placement of bands in which each ply is formed by laying up in contact on a mold of bands side by side, each band being formed of a single tow, of a greater width than in the case of the placement of tows. The tows typically used are unidirectional and include a multitude of filaments. The laid fibers can be pre-impregnated with resin or not. The technology for the placement of tows, using tows of a smaller width, enables laying up on layup surfaces of complex shapes. Parts are manufactured by automatic placement machines, to which are given the trajectories of fibers to produce the plies. In the case of the placement of tows, these machines are typically called fiber placement machines or AFP machines (Automated Fiber Placement) and tape placement machines or ATP machines (Automated Tape Placement) in the case of the placement of bands.

The fiber trajectories are typically defined by software by means of a rosette, consisting of a system of axes associated to a transfer method which enables the definition of a fiber direction on all points of a surface. Today there are different rosettes, based on different transfer methods, which are recognized and used in the aerospace sector according to the layup surface, such as for example Cartesian rosette or the translation rosette.

Each trajectory is generated by defining the direction of the trajectory at different analysis points of the layup surface, also called propagation points, by transfer of the axes system to said analysis point according to the associated transfer method. These transfers of the axis system for the propagation points require calculation time which can prove to be relatively long, particularly in the case of complex surfaces.

The trajectories obtained are then typically subjected to a curvature analysis, commonly called "steering" analysis, and/or an angular deviation analysis. The steering analysis at an analysis point of a trajectory consists of calculating the value of the mean radius of curvature in the plane tangent to the surface at the analysis point.

Following these analysis results, the trajectories must be redefined manually to adjust the trajectories to the acceptable or achievable minimum radii of curvature with a given fiber, and to the maximum angular deviation desired by the designer of the part. Therefore, the definition of the trajectories can prove to be long and tedious.

In the case of non-continuous layup surfaces comprising recesses and/or embossments, in particular for producing reinforcements, the positioning of prefabricated reinforcements, the positioning of honeycombs or others, the definition of satisfactory trajectories at the level of these discontinuities proves to be complicated, and requires lengthy manual operations.

The purpose of embodiments of the present invention is to propose a solution aiming to overcome at least one of the aforementioned disadvantages.

SUMMARY OF THE INVENTION

To this end, embodiments of the present invention provides a method for defining the fiber trajectories on a layup surface for producing at least one ply having a given theoretical orientation, for the production of parts made of composite material by the laying up of fibers, including the steps of:
- the definition of a finite element mesh of the layup surface,
- the definition of a finite element transfer mesh of a transfer surface corresponding to a simplified surface, substantially continuous, of the layup surface, the direction of a fiber at an analysis point of an element of the layup surface, for the definition of the trajectory of the fiber for at least one ply orientation, being obtained by:
- the definition of a projected point obtained by normal projection of an analysis point of the element, on the transfer mesh,
- the definition of a reference direction at the projected point, from the direction data associated to a transfer method,
- the definition of the normal to the transfer element,
- the definition of a cutting plane, the cutting plane being defined by the projected point, the reference direction and the normal,
- the definition of the line of intersection of the cutting plane with the plane of the element, the direction of the fiber at the analysis point being obtained from the direction of this line of intersection.

The use of such a simplified transfer surface for the transfer of direction data proves itself to be particularly effective for the definition of acceptable trajectories in terms of the radius of curvature and of angular deviation in the case of non-continuous layup surfaces, having recesses and/or embossments generating ramps.

The method according to embodiments of the invention can be implemented automatically under the form of software. The method according to embodiments of the invention can be used for producing parts made of composite material by laying up fibers, whether by layup by contact, such as by placement of tows or by placement of bands, or by layup without contact such as by filament winding. The method according to embodiments of the invention is of particular interest in the case of the placement of tows on non-planar layup surfaces.

The direction data associated to a transfer method are constituted of a classic rosette or a combination of classic rosettes, or of a constraint grid and/or constraint curves, associated to a transfer method comprising a method for weighting the constraint vectors of the curves and/or the grid, such as described in the patent application filed by the applicant, and entitled "Method for defining fiber trajectories from curves or constraint grid".

Embodiments of the present invention also concerns a process for manufacturing parts made of composite materials by an automatic fiber layup machine, characterized in that the trajectories of the fibers for the layup of plies by the layup machine are defined by the method for defining the trajectory as described previously.

Embodiments of the present invention also concern a computer program comprising a set of instructions capable of implementing the method for defining the trajectory such as described previously, when the program is executed on a computer.

DESCRIPTION OF THE DRAWINGS

The invention will be better understood, and the other objectives, details, characteristics and advantages will appear more clearly during the detailed explanatory description which follows several specific embodiments currently preferred from the invention, with reference to the appended schematic drawings, in which.

DETAILED DESCRIPTION

According to the embodiments of invention, as shown in the figure, the trajectories of the fibers are defined from a transfer surface by using possibly classic rosettes, constraint curves and/or a constraint grid, and/or constraint curves obtained from an angular deviation grid. The trajectories can be generated by using a vector field composed of a mesh of the layup surface in which a direction vector is associated to each element.

Figure 2:
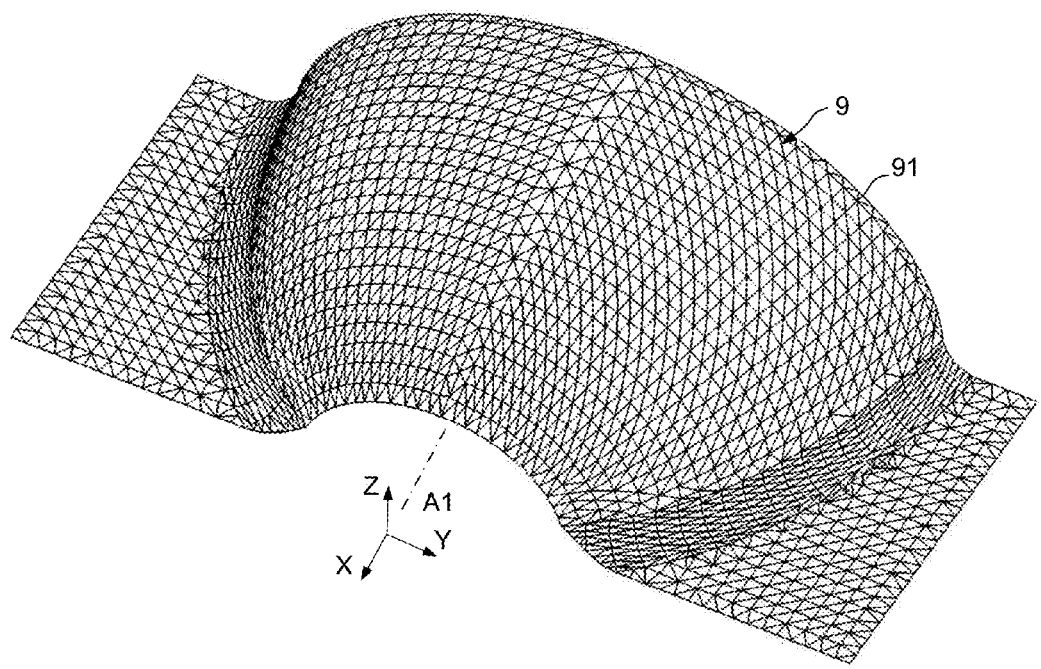
FIG. 2 is a perspective view of an example of a layup surface.

FIG. 2 illustrates a layup surface 9, this layup surface is a double curvature surface, and is defined by a finite element mesh 91.

Figure 3:
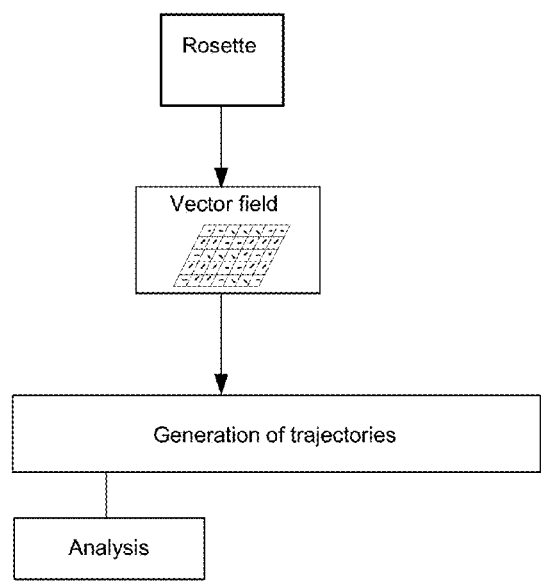
FIG. 3 is a diagram illustrating a method for defining trajectories, using a vector field obtained from a classic rosette.

FIG. 3 illustrates a vector field obtained from a classic rosette, such as a Cartesian rosette comprising a reference coordinate system defined by three orthogonal vectors X, Y, Z and a Cartesian transfer method. In the case of the layup surface of FIG. 2, the vector X of the so-called global rosette is aligned with the main axis $A_1$ or rotation axis of the layup surface.

Figure 4:
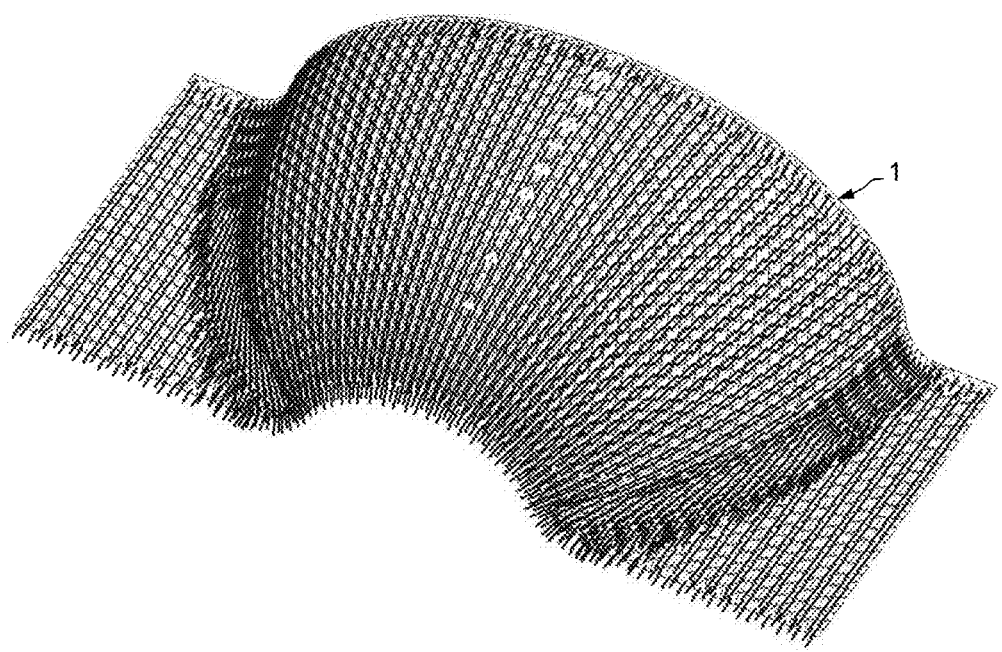
FIG. 4 is a perspective view of the vector field obtained according to the method for FIG. 3.
Figure 5:
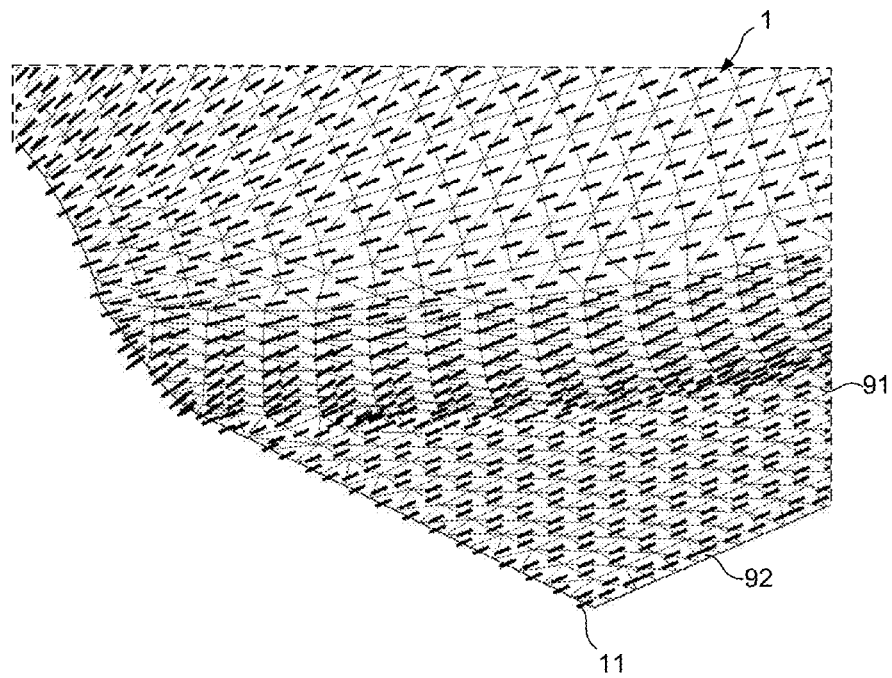
FIG. 5 is a partial enlarged view of FIG. 4.

The vector field is obtained using the Cartesian transfer of the vector X of the global rosette on each element 92 of the mesh, the Cartesian transfer of the vector X on the element consisting of a normal projection of the vector X on the plane of the relevant element, the projected vector of the so-called projected rosette constituting the direction vector 11 of the element. FIGS. 4 and 5 illustrate the resulting vector field 1.

Figure 6A:
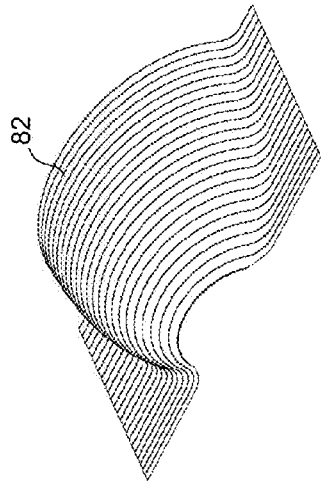
FIG. 6A is a perspective view of the fiber trajectories for a ply at 0°, obtained from the vector field of FIG. 4.

Trajectories 81 of the fiber for a ply orientation at 0° can then be generated from this vector field 1, as shown in FIG. 6A. Each trajectory is generated by defining the direction of the trajectory at different analysis points, also called propagation points, the direction at a propagation point is that of the direction vector of the element to which said propagation point belongs to.

Figure 6B:
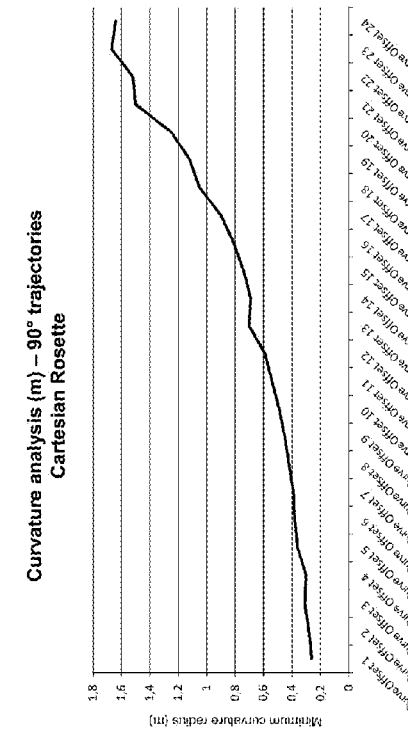
FIG. 6B is an analysis of the radius of curvature of the trajectories.

An analysis of the radius of curvature can then be performed on these thus obtained trajectories. FIG. 6B illustrates the minimum radius of curvature of each trajectory. This analysis of the radius of curvature shows large radii of curvature, incompatible for example with the placement of tows of a quarter of an inch in width, for which a minimum radius of curvature of approximately 2 meters is typically advocated.

An analysis of the radius of curvature and/or angular deviation can be performed directly from the vector field, without generating trajectories, this analysis may for example be displayed on the vector field by assigning different colors to the vectors according to the values of the radius of curvature or the angular deviation.

Figure 7A:
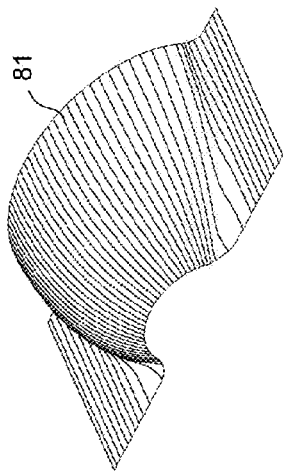
FIG. 7A is a perspective view of the fiber trajectories for a ply at 90°, obtained from the vector field of FIG. 4.
Figure 7B:
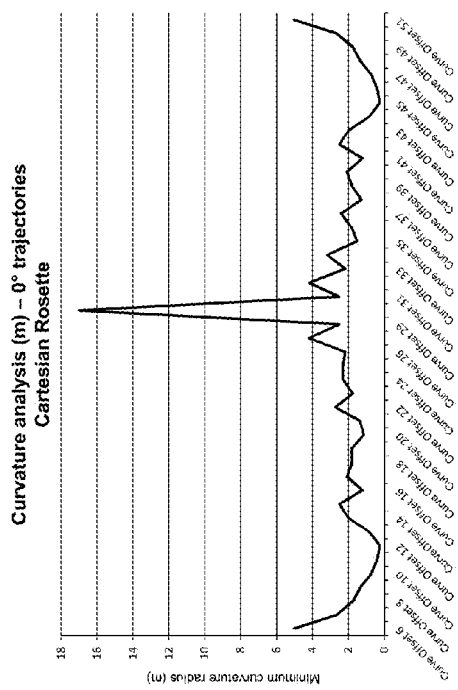
FIG. 7B is an analysis of the radius of curvature of the trajectories.

Fiber trajectories for other ply orientations, such as 90°, +45° or −45°, can be generated from the same vector field 1, by performing a corresponding rotation of the direction vectors. FIG. 7A illustrates the fiber trajectories for a ply orientation at 90°, obtained by performing a 90° rotation of the direction vectors of the vector field 1. FIG. 7B illustrates the minimum radius of curvature of each trajectory.

Figure 8:
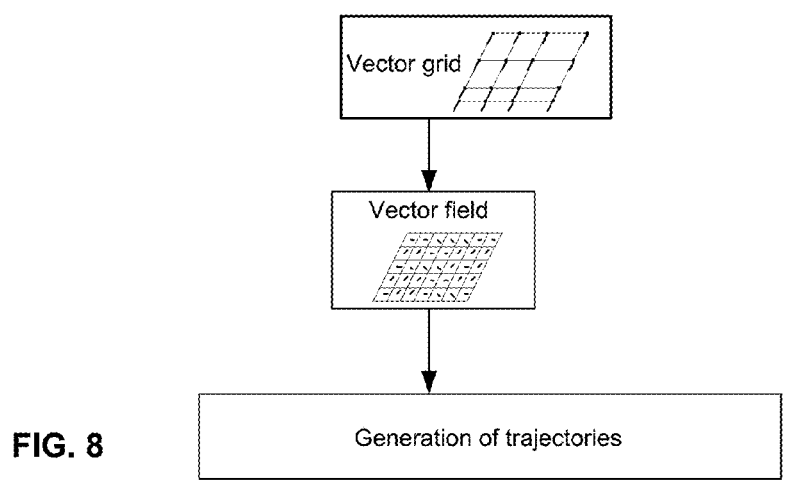
FIG. 8 is a diagram illustrating a method for defining the trajectories, using a vector field obtained from a constraint vector grid.

FIG. 8 illustrates a vector field obtained from a constraint grid, to take into account the design and/or manufacturing constraints within the definition of the trajectories, and thus obtain trajectories with acceptable radii of curvature.

Figure 9:
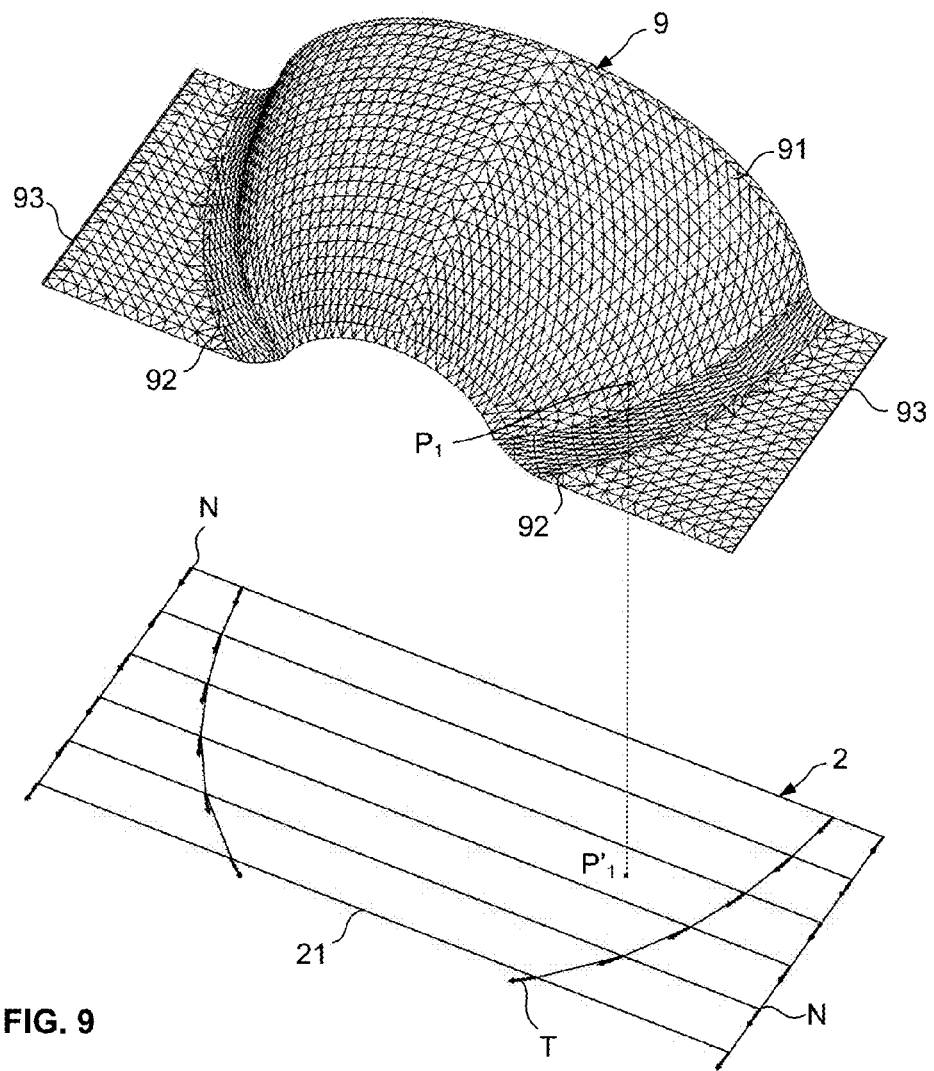
FIG. 9 is a schematic perspective view of the constraint grid defined from the lay-up surface.

With reference to FIG. 9, one defines in the first instance a constraint grid 2, also called constraint vector grid. In this example, the constraint grid is defined according to the geometric constraints of the layup surface, here the geometric constraints being the following:
- the fibers of the ply at 0° must follow the generatrix line 92 of the connecting radii between the globally frustoconical central part of the layup surface and the planar parts on either side of said frustoconical part, and
- the fibers of the ply at 0° must be aligned with the outer edges 93 of the planar parts.

A mesh 21 is defined from these geometric constraints, each element of the mesh being formed of at least four nodes, then a constraint vector T is assigned to each node N of the mesh to form the constraint grid 2.

To form the vector field, the direction of each mesh element is defined in the following manner.

As shown in FIG. 9, one performs a normal projection of the center point $P_1$ of the element, to the nearest point, on the constraint grid.

Figure 10:
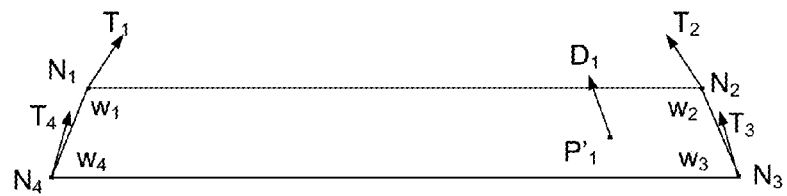
FIG. 10 is a diagram illustrating the method for defining the direction vector of an element from a point projected on the constraint grid.

With reference to FIG. 10, one then performs a calculation of the normalized weights $w_1$, $w_2$, $w_3$, $w_4$ at the projected point $P_1$, of the four nodes $N_1$, $N_2$, $N_3$, $N_4$ which are associated to said projected point, namely the four nodes that define the element to which the projected point belongs. These normalized weights, also called barycentric coordinates of the projected point, are calculated according to a method known per se, depending on the distance between said projected point and said nodes. Next one determines vector $D_1$ at the projected point by weighting the four vectors $T_1$, $T_2$, $T_3$, $T_4$ by their respective normalized weights $w_1$, $w_2$, $w_3$, $w_4$:

$$D_1 = \|T_1 \times w_1 + T_2 \times w_2 + T_3 \times w_3 + T_4 \times w_4\|$$

The direction vector of the element is then obtained by a transfer by normal projection of this vector $D_1$ to the central point $P_1$ of the element.

Figure 11:
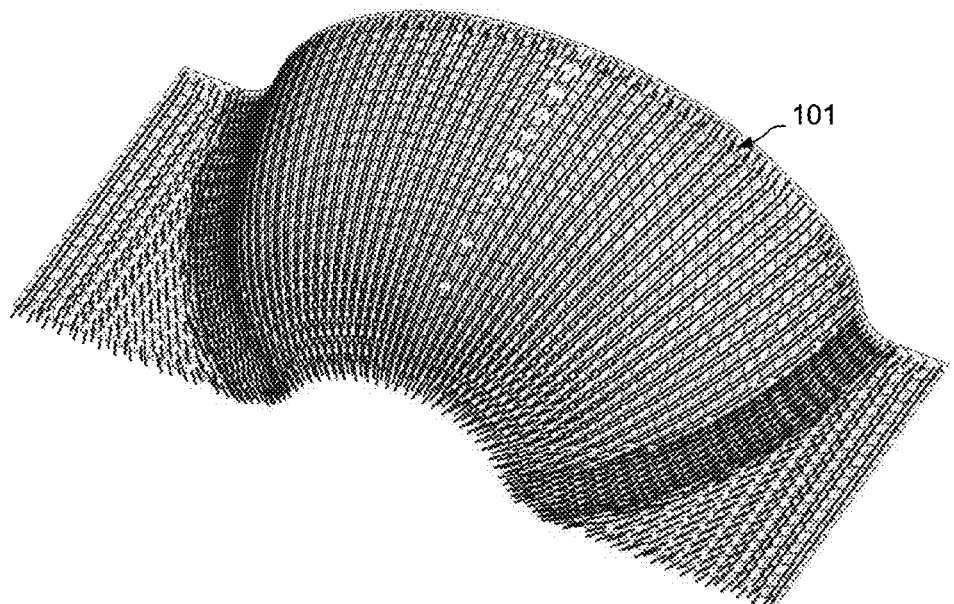
FIG. 11 is a perspective view of the vector field obtained according to the method for FIG. 8, with the constraint grid of FIG. 9.
Figure 12:
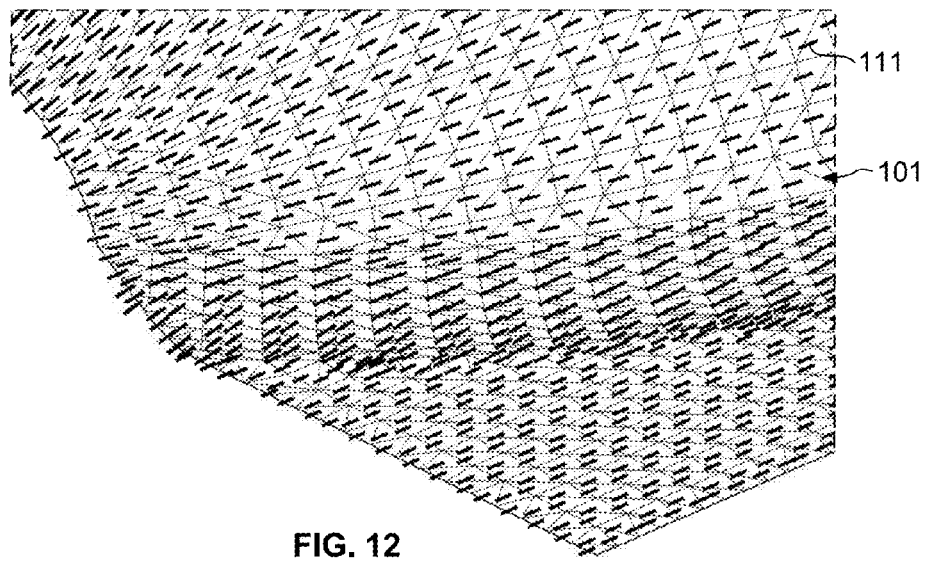
FIG. 12 is a partial enlarged view of FIG. 11.

FIGS. 11 and 12 illustrate the resulting vector field 101, in which a direction vector 111 is associated to each element.

Figure 14A:
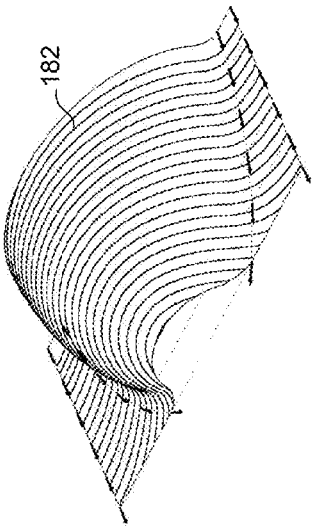
FIG. 14A is a perspective view of the fiber trajectories for a ply at 90° obtained from the vector field of FIG. 11.
Figure 14B:
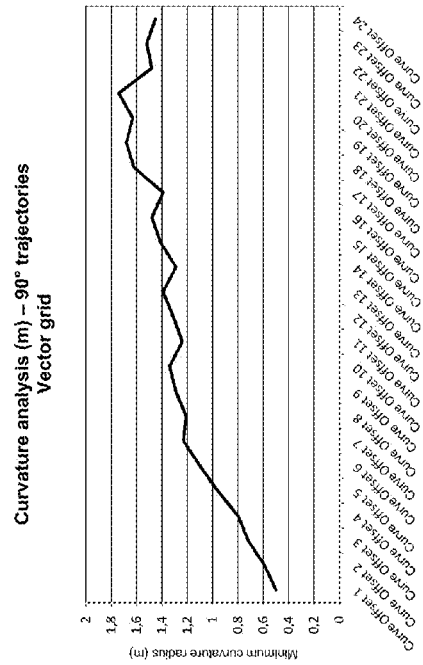
FIG. 14B is an analysis of the radius of curvature of the trajectories.
Figure 13A:
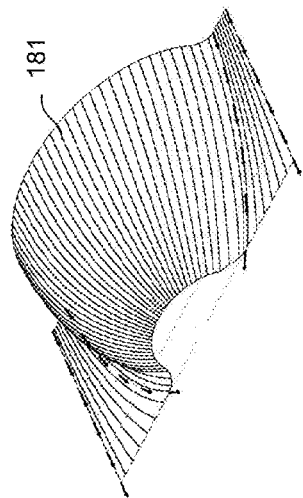
FIG. 13A is a perspective view of the fiber trajectories for a ply at 0° obtained from the vector field of FIG. 11.
Figure 13B:
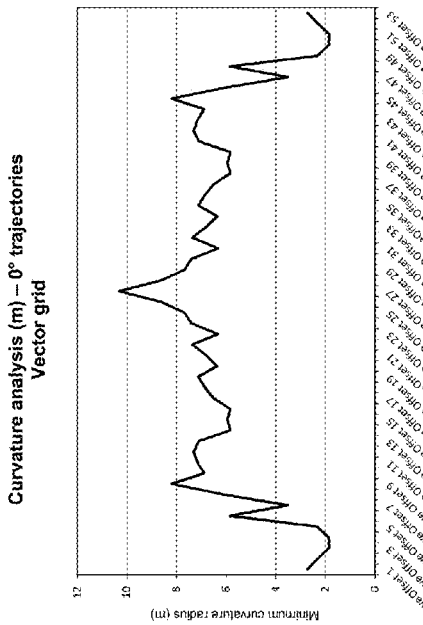
FIG. 13B is an analysis of the radius of curvature of trajectories of FIG. 13A, B.

FIGS. 13A and 13B respectively illustrate the trajectories 181 for a ply at 0°, obtained from this vector field, and the results of the corresponding analysis of the radius of curvature. FIGS. 14A and 14B respectively illustrate the trajectories 182 for a ply at 90°, obtained from this vector field, after a 90° rotation of the direction vectors, and the results of the corresponding analysis of the radius of curvature. Comparisons of FIGS. 6B and 7B with FIGS. 13B and 14B respectively show that the trajectories obtained with the constraint grid have larger minimum radius of curvatures than those of trajectories resulting from a Cartesian rosette.

Figure 15:
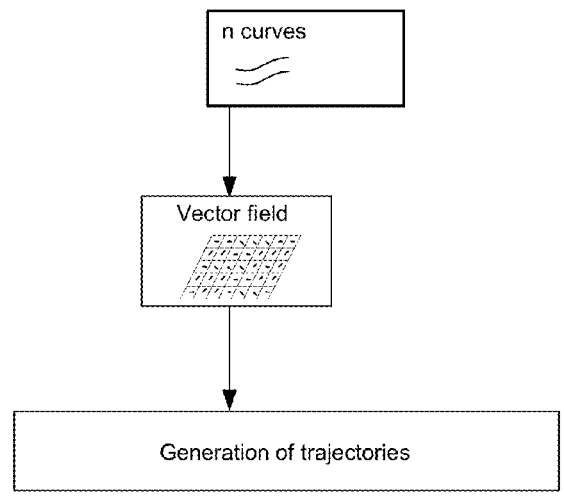
FIG. 15 is a diagram illustrating a method for defining trajectories, using a vector field obtained from the constraint curves.

FIG. 15 illustrates a vector field obtained from the constraint curves. Geometric constraints represented under the form of a constraint grid 2 in the previous embodiment are represented here under the form of constraint curves.

Figure 16:
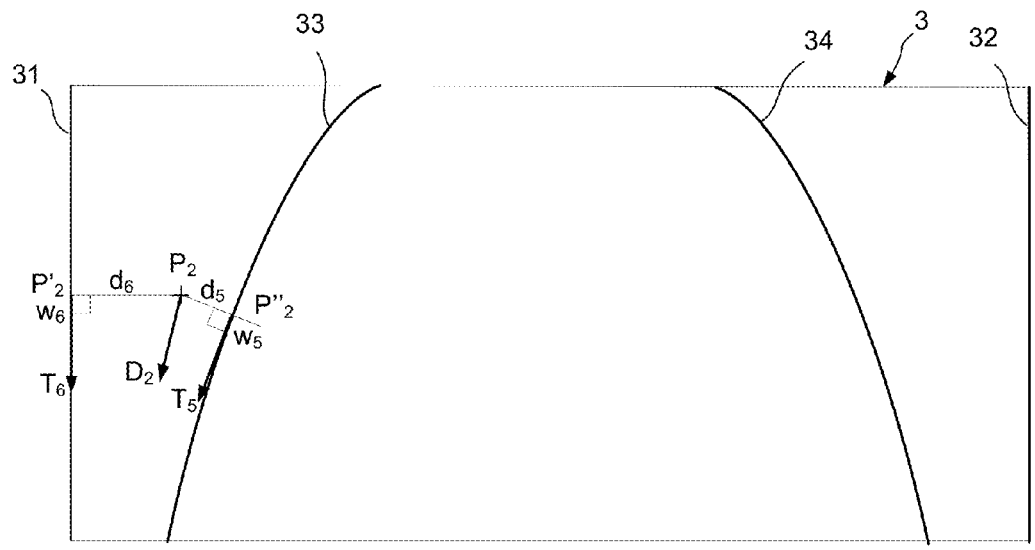
FIG. 16 is a diagram illustrating the method for defining a direction vector of the vector field from the constraint curves.

With reference to FIG. 16, the constraint curves, collectively referred to under reference 3, include:
- two linear constraint curves 31, 32 corresponding to the outside edges 93 of the layup surface, and
- two curved constraint curves 33, 34 corresponding to the generatrix lines of connecting radii between the central part and lateral parts of the layup surface.

To form the vector field, the direction vector of each element of the mesh is defined in the following manner.

Considering the central point $P_2$ of an element on FIG. 16, one performs a normal projection of the central point $P_2$ on the two closest constraint curves 31, 33, between which the central point is positioned. One then defines, at said projected points $P'_2$ $P''_2$ the two vectors $T_5$, $T_6$ tangent to the curves.

One calculates the normalized weights $w_5$, $w_6$, at central point $P_2$, of the two projected points, these normalized weights being a function of the distances $d_5$ and $d_6$ between the central point and the projected points:

$$w_5 = 1 - (d_5/(d_5 + d_6))$$

$$w_6 = 1 - (d_6/(d_5 + d_6))$$

One then defines the vector $D_2$, which corresponds to the direction vector of the element, by weighting the two tangent vectors $T_5$, $T_6$ by their respective normalized weights $w_5$, $w_6$:

$$D_2 = \|T_5 \times w_5 + T_6 \times w_6\|$$

The vector $D_2$ of the element corresponds to the direction vector $D_2$ thus obtained. The vector field obtained from these constraint curves 3 is similar to that 101 previously obtained by means of the constraint grid.

Figure 17:
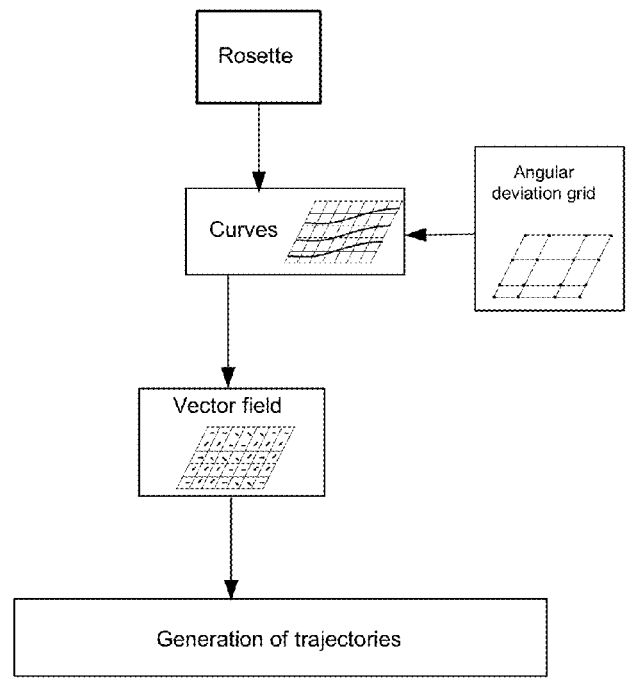
FIG. 17 is a diagram illustrating a method for defining the trajectories, using a vector field obtained from the constraint curves, the constraint curves being obtained from an angular deviation grid.

FIG. 17 illustrates a vector field obtained from the constraint curves which are defined from an angular deviation grid.

Figure 18:
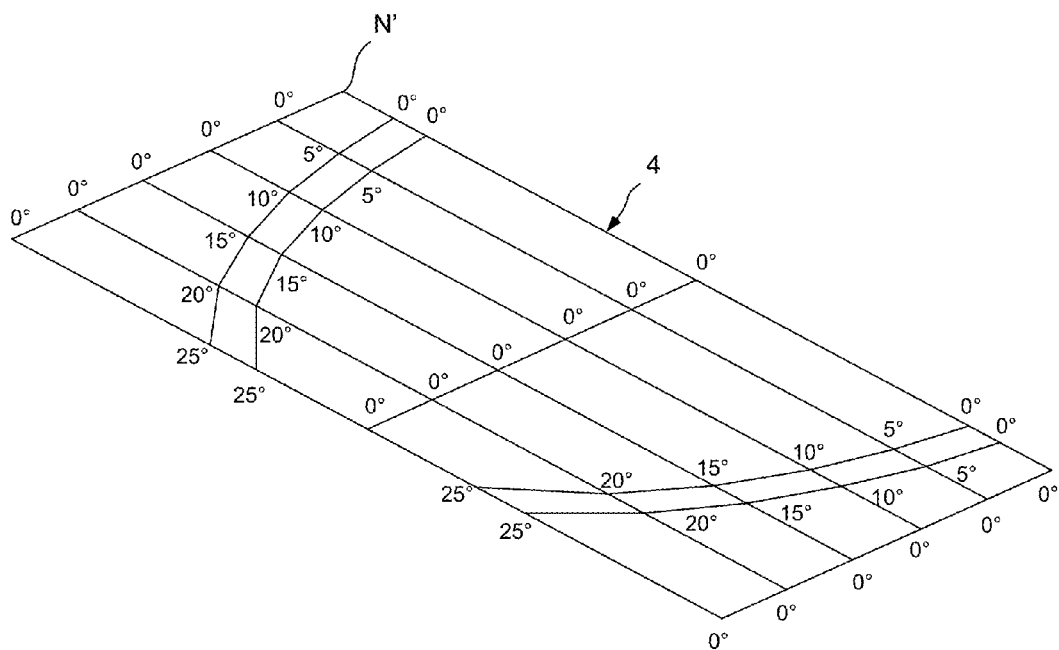
FIG. 18 is a schematic perspective view of the angular deviation grid defined from the lay-up surface.

With reference to FIG. 18, one defines in a first instance an angular deviation grid 4, in which each element is defined by four nodes N', and one assigns to each node of the grid a maximum angular deviation value. An example of deviation values assigned to the different nodes is given in FIG. 18.

Constraint curves are generated on the layup surface by defining for each constraint curve the propagation directions at different points of analysis also called propagation points. The propagation direction at a propagation point $P_3$ is defined in the following manner.

Figure 19:
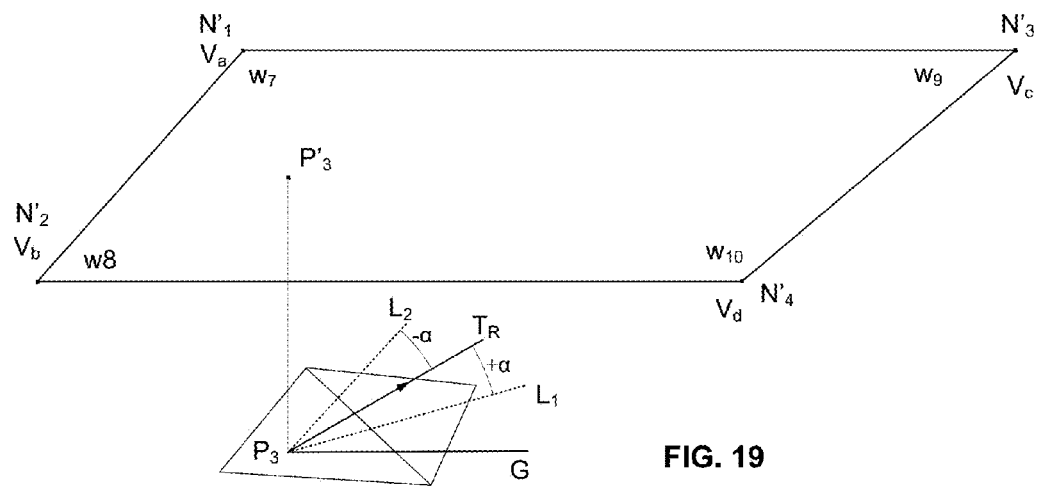
FIG. 19 is a diagram illustrating the method for generating the constraint curves from the angular deviation grid of FIG. 18.

With reference to FIG. 19, one defines a reference direction at the propagation point $P_3$, this reference direction $T_R$ being in this embodiment a direction obtained by a Cartesian rosette, by transfer by normal projection of the vector X of the global rosette on the plane of the element of the layup surface to which said propagation point $P_3$ belongs.

Next one performs a normal projection of said point $P_3$ on the angular deviation grid, the projected point $P'_3$ belonging for example to the element of the grid defined by the four nodes $N'_1$, $N'_2$, $N'_3$, $N'_4$ One performs a calculation of the normalized weights $w_7$, $w_8$, $w_9$, $w_{10}$ at the projected point $P'_3$ of the four nodes. These normalized weights, also called barycentric coordinates of the projected point, are calculated according to a method known per se, depending on the distance between said projected point and said nodes. One performs a weighting of the four maximum angular deviation values $V_a$, $V_b$, $V_c$, $V_d$ by the normalized weights to obtain an authorized maximum angular deviation value $\alpha$ associated to said projected point:

$$\alpha = w_7 \times V_a + w_8 \times V_b + w_9 \times V_c + w_{10} \times V_d$$

Next one determines a tolerance sector around the reference direction $T_R$ by defining direction limits $L_1$ and $L_2$ at an angle of $+\alpha$ and $-\alpha$ around the reference direction. Furthermore one determines a geodesic direction G corresponding to the propagation direction at the propagation point $P_3$ of a geodesic curve.

This is followed by a reorientation of the reference direction within the limits of the authorized angular deviation value. If the geodesic direction G is included in the tolerance sector, then the propagation direction at the propagation point is defined as being the geodesic direction. If the geodesic direction is not included in the tolerance sector, then the propagation direction at the propagation point is defined as being the direction limit $L_1$ or $L_2$ the closest to the geodesic direction.

Figure 20:
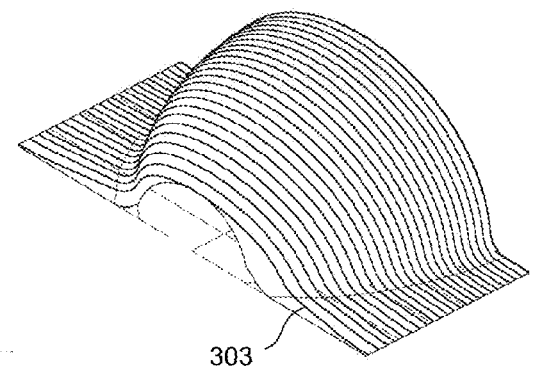
FIG. 20 is a view of constraint curves generated from the angular deviation grid of FIG. 18 and a classic rosette.

FIG. 20 illustrates an example of a constraint curve, designated under the general reference 303, obtained for plies at 90°, from a Cartesian rosette and the angular deviation grid, with the angular deviation values indicated in FIG. 18.

Figure 21:
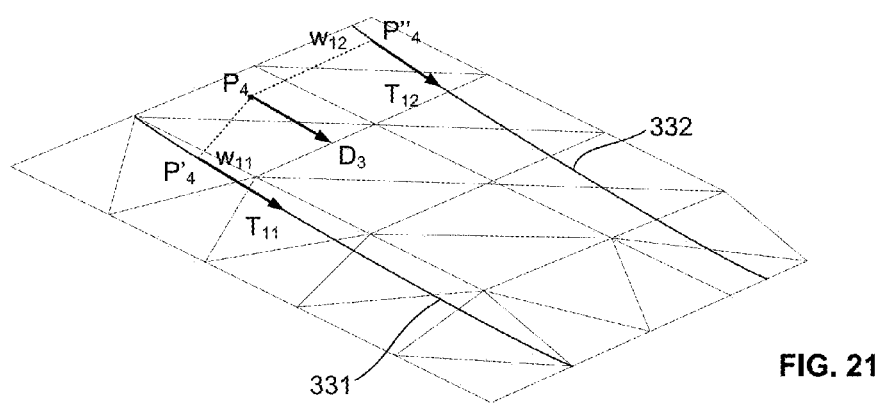
FIG. 21 is a diagram illustrating the method for defining the direction vector of an element from the angular deviation curves.

Obtaining a vector field is carried out according to the method described previously with constraint curves 3 of FIG. 16. The direction vector of each element of the mesh is defined in the following manner. With reference to FIG. 21, one performs a normal projection of the central point $P_4$ of the element on the two closest constraint curves 331, 332. Next one defines at the projected points $P'_4$, $P''_4$ the two vectors $T_{11}$, $T_{12}$ tangent to the curves. One calculates the normalized weights $W_{11}$, $W_{12}$, at the central point P', of two projected points, these normalized weights being a function of the distances between the central point and the projected points. Then one defines the vector $D_3$, of the element, by weighting the two tangent vectors $T_{11}$, $T_{12}$ by their respective normalized weights $w_{11}$, $w_{12}$:

$$D_3 = \|w_{11} \times T_{11} + w_{12} \times T_{12}\|$$

The direction vector of the element corresponds to the vector $D_3$, preferably after a 90° rotation of the vector D3 to have a vector field concerning the plies at 0° by default.

Figure 22:
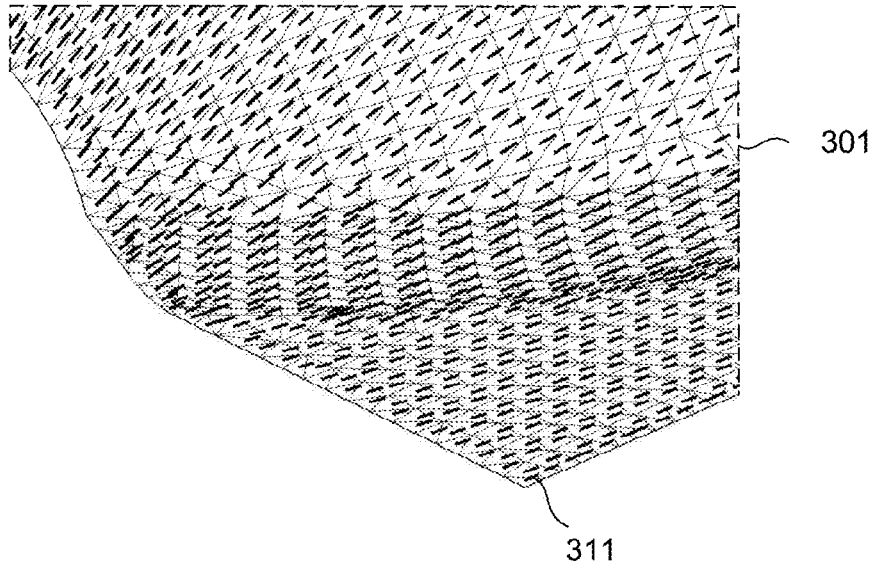
FIG. 22 is a partial view of the vector field obtained from the angular deviation grid.
Figure 23:
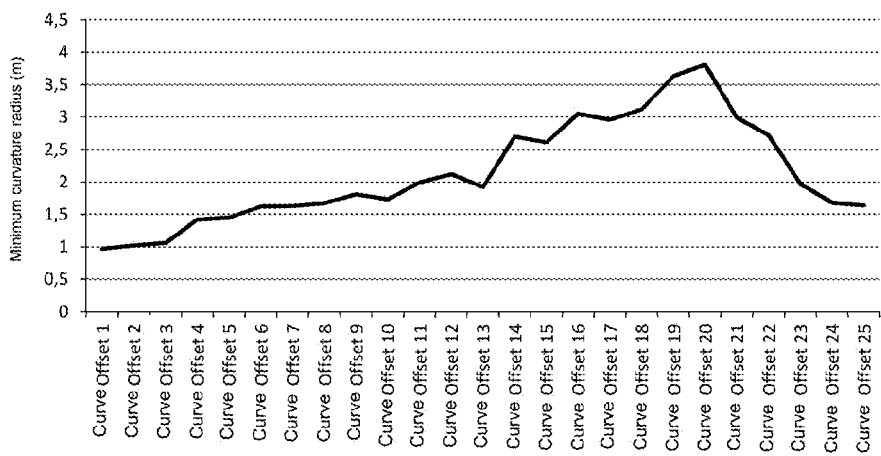
FIG. 23 is an analysis of the radius of curvature of the trajectories obtained from the vector field of FIG. 22 for a ply at 90°.

The vector field 301 obtained from these constraint curves is shown in FIG. 22, the vector field comprising a direction vector 311 associated to each element. The results of the analysis of the radius of curvature of the fiber trajectories, obtained from this vector field, or corresponding to the constraint curves 303 of FIG. 20 are shown in FIG. 23. These results show a significant increase in the minimum radius of curvatures of the trajectories relative to those of trajectories shown in FIG. 7B and simply obtained by means of a Cartesian rosette.

A vector field can also be obtained from a constraint vector grid and an angular deviation grid. In this case, for the generation of the constraint curves according to the method explained above with reference to FIG. 19, the definition of the reference direction $T_R$ is made, not from the Cartesian rosette, but from the constraint vector grid, by normal projection of the point $P_3$ on the constraint grid and the definition of a vector $D_1$ according to the weighting method explained previously with reference to FIG. 10. The reference direction $T_R$ of the element is then obtained by a transfer by normal projection of this vector $D_1$ at the point $P_3$.

Figure 24:
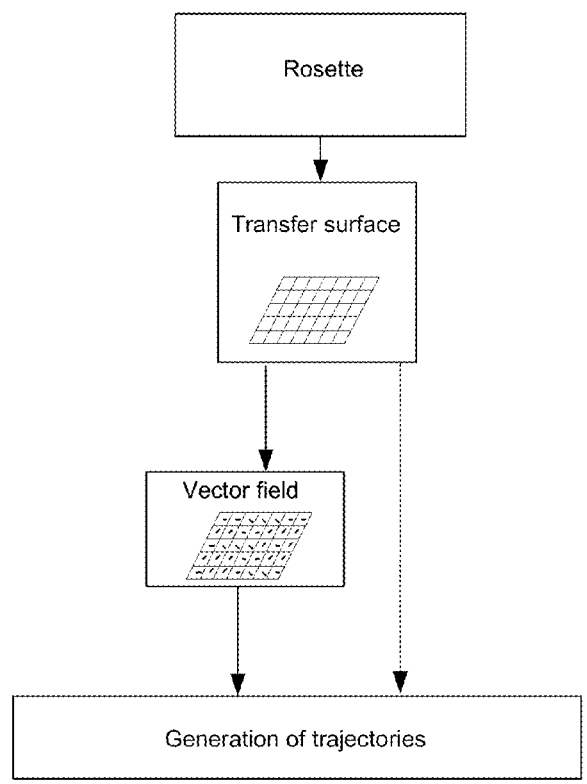
FIG. 24 is a diagram illustrating a method for defining the trajectories, according to an embodiment of the invention, using a vector field obtained from a transfer surface.

FIG. 24 illustrates an embodiment of the invention wherein the vector field is obtained by using a transfer surface for the transfer of a Cartesian rosette. This type of vector field is appropriate for the definition of the trajectories on a non-continuous lay up surface, such as the layup surface 109 illustrated in FIG. 26A. This layup surface is of generally frustoconical shape and comprises a central recess 194, forming ramps 195.

One defines a so-called continuous transfer surface which corresponds to a simplified surface of the lay-up surface. In this case, the transfer surface corresponds to the layup surface without its central recess. This transfer surface is defined by a so-called transfer mesh.

Figure 25:
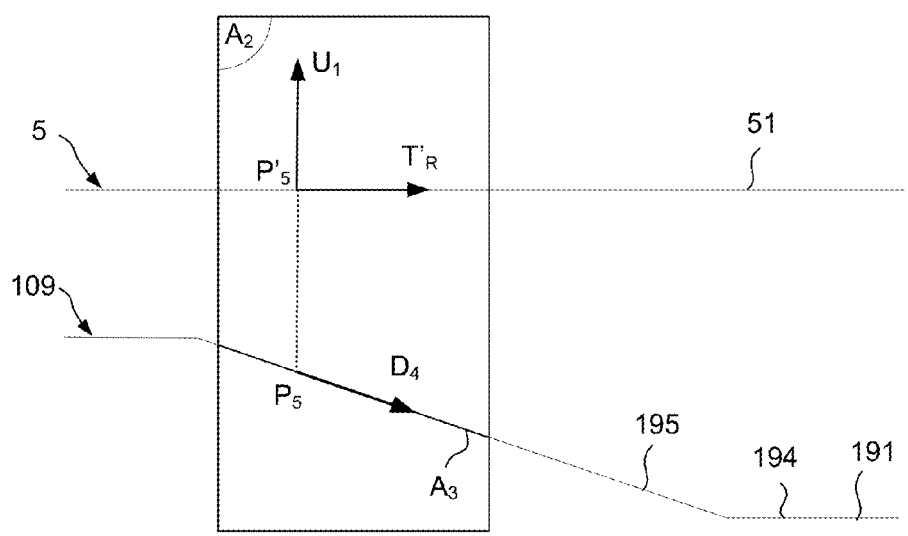
FIG. 25 is a diagram illustrating the method for defining a direction vector from a vector field from a transfer surface.

To form the vector field, the direction vector of each element of the mesh 191 of the layup surface is defined in the following manner, with reference to FIG. 25:
 definition of a projected point $P'_5$ obtained by normal projection of the central point $P_5$ of said element on the transfer mesh 51,
 definition of a reference direction $T'_R$ at the projected point $P'_5$, the reference direction here coming from a Cartesian rosette and being obtained by transfer of the X axis of the rosette on the plane of the transfer element to which the projected point $P'_5$ belongs,
 definition of the normal $U_1$ to the transfer element,
 definition of a cutting plane $A_2$, the cutting plane being defined by the projected point $P'_5$, said reference direction $T'_R$ and the normal $U_1$, and
 definition of the line of intersection $D_4$ of the cutting plane $A_2$ with the plane $A_3$ of the element to which the central point belongs, the direction vector of the element corresponding to the direction of this line of intersection.

Figure 26A:
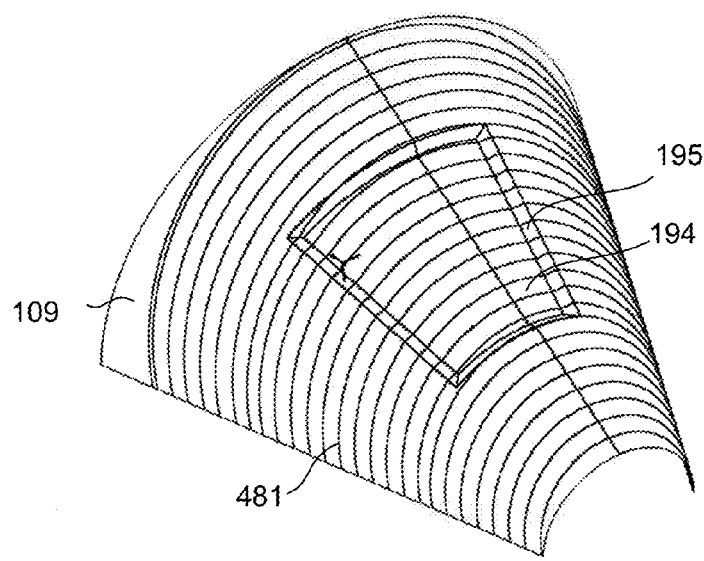
FIG. 26 A is a perspective view of fiber trajectories obtained with a transfer surface.
FIG. 26B is a partial enlarged view of FIG. 26A.
Figure 26B:
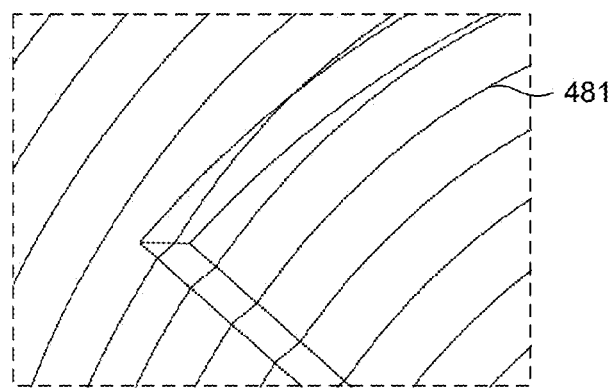
Figure 27:
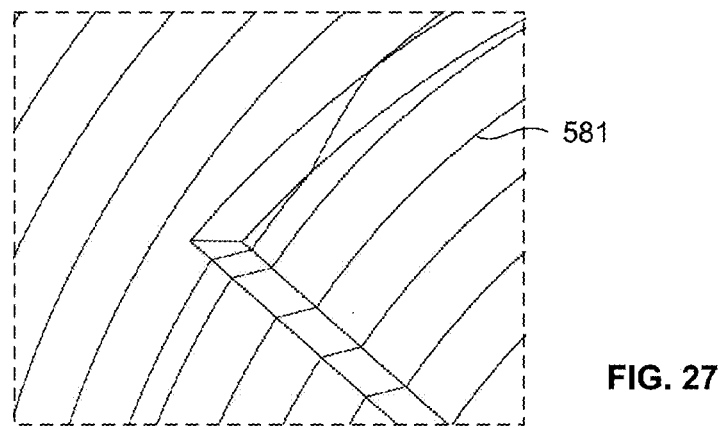
FIG. 27 is a view similar to that of FIG. 26B, the trajectories being obtained without the use of the transfer surface.

FIGS. 26A and 26B illustrate the trajectories 481 of the plies at 90°, obtained with such vector field, after a 90° rotation of the direction vectors. FIG. 31 illustrates the trajectories 581 obtained with a vector field defined from a rosette transfer directly on the layup surface, without use of the transfer surface.

According to an alternative embodiment of the invention, such as is illustrated by the arrow in a discontinuous line in FIG. 24, the trajectories are generated directly, without using a vector field.

According to another embodiment, the vector field is obtained from a constraint vector grid and a transfer surface. In this case, for the definition of the cutting plane $A_2$ according to the method explained above with reference to FIG. 25, the definition of the reference direction $T'_R$ is produced, not from the Cartesian rosette, but from the constraint vector grid, by normal projection of the point $P'_5$ on the constraint grid and the definition of a vector $D_1$ according to the weighting method explained previously with reference to FIG. 10. The reference vector $T'_R$ of the element is then obtained by a transfer by normal projection of this vector $D_1$ to the point $P'_5$.

Figure 28:
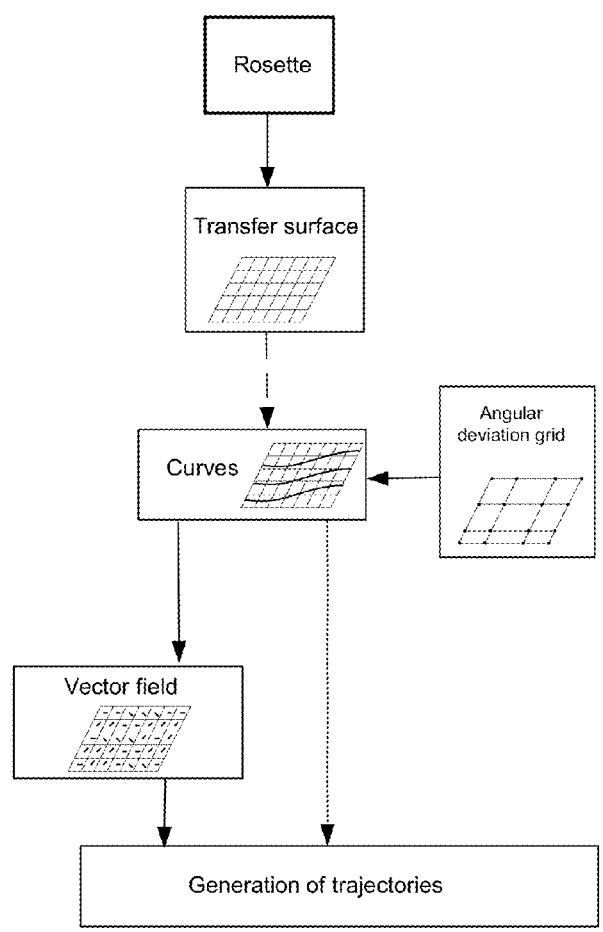
FIG. 28 is a flow diagram of a method for defining the trajectories, according to another embodiment of the invention, using a vector field obtained from an angular deviation grid and a transfer surface.
Figure 29:
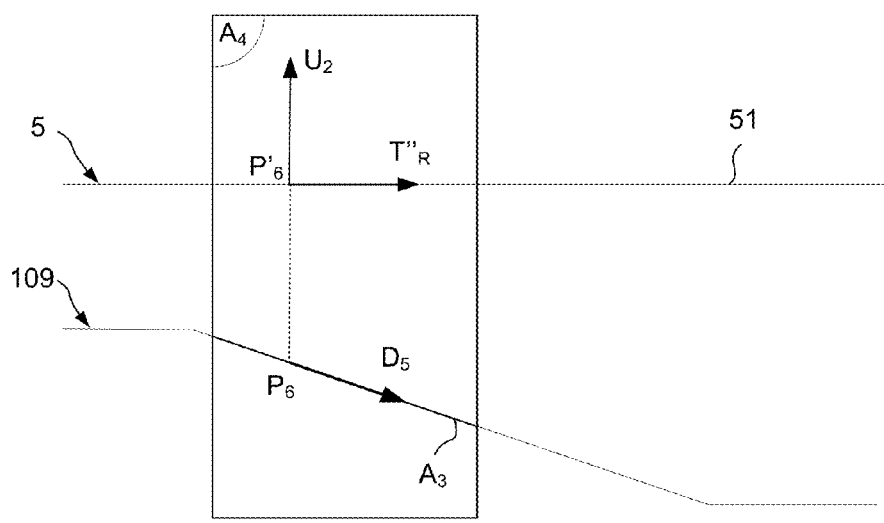
FIG. 29 is a diagram illustrating the method for defining a reference direction for the definition of a propagation direction for the method for FIG. 28; and, FIG. 30 is a diagram illustrating a shear analysis step from several vector fields.
Figure 30:
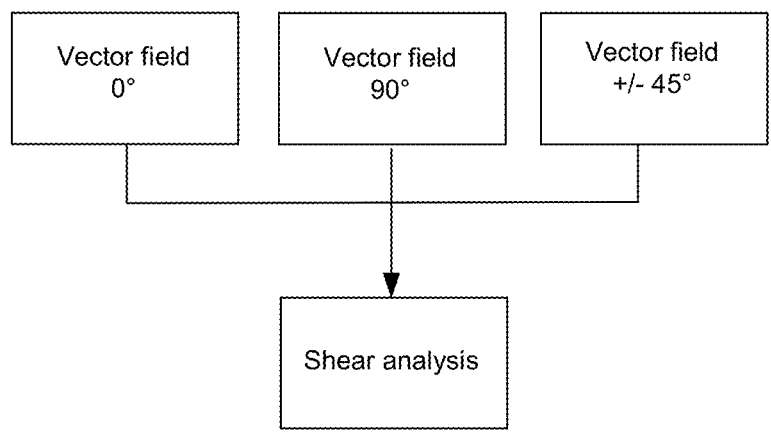

According to another embodiment illustrated in FIG. 28, the vector field is obtained from an angular deviation grid and a transfer surface. In this case, for the generation of constraint curves according to the method explained above with reference to FIG. 19, the definition of the reference direction $T_R$ for each propagation point $P_6$ is produced in the following manner, with reference to FIG. 29:
  definition of a projected point $P'_6$ obtained by normal projection of the propagation point $P_6$ on the transfer mesh 5,
  definition of a reference direction $T''_R$ at the projected point $P'_5$, the reference direction here coming from a Cartesian rosette and being obtained by transfer of the X axis of the rosette on the plane of the transfer element to which the projected point $P'_6$ belongs;
  definition of the normal $U_2$ to the transfer element;
  definition of a cutting plane $A_4$, the cutting plane being defined by the projected point $P'_6$, the reference direction $T''_R$ and the normal $U_2$,
  definition of the line of intersection $D_5$ between the cutting plane $A_4$ and the plane $A_5$ of the element, the reference direction $T_R$ corresponding to the direction of this line of intersection.

The direction of the propagation at the point $P_6$ is then obtained as described previously with reference to FIG. 19, by using the maximum angular deviation value obtained from the angular deviation grid.

According to another embodiment, the vector field is obtained from a constraint vector grid, an angular deviation grid and a transfer surface. In this case, for the definition of the cutting plane $A_4$ above, the definition of the reference direction $T''_R$ is made, not from the Cartesian rosette, but from the constraint vector grid, by normal projection of the point $P'_6$ on the constraint grid and definition of a vector $D_1$ according to the weighting method explained previously with reference to FIG. 10. The reference vector $T''_R$ of the element is then obtained by a transfer by normal projection of this vector $D_1$ at the point $P'_6$.

Figure 1:
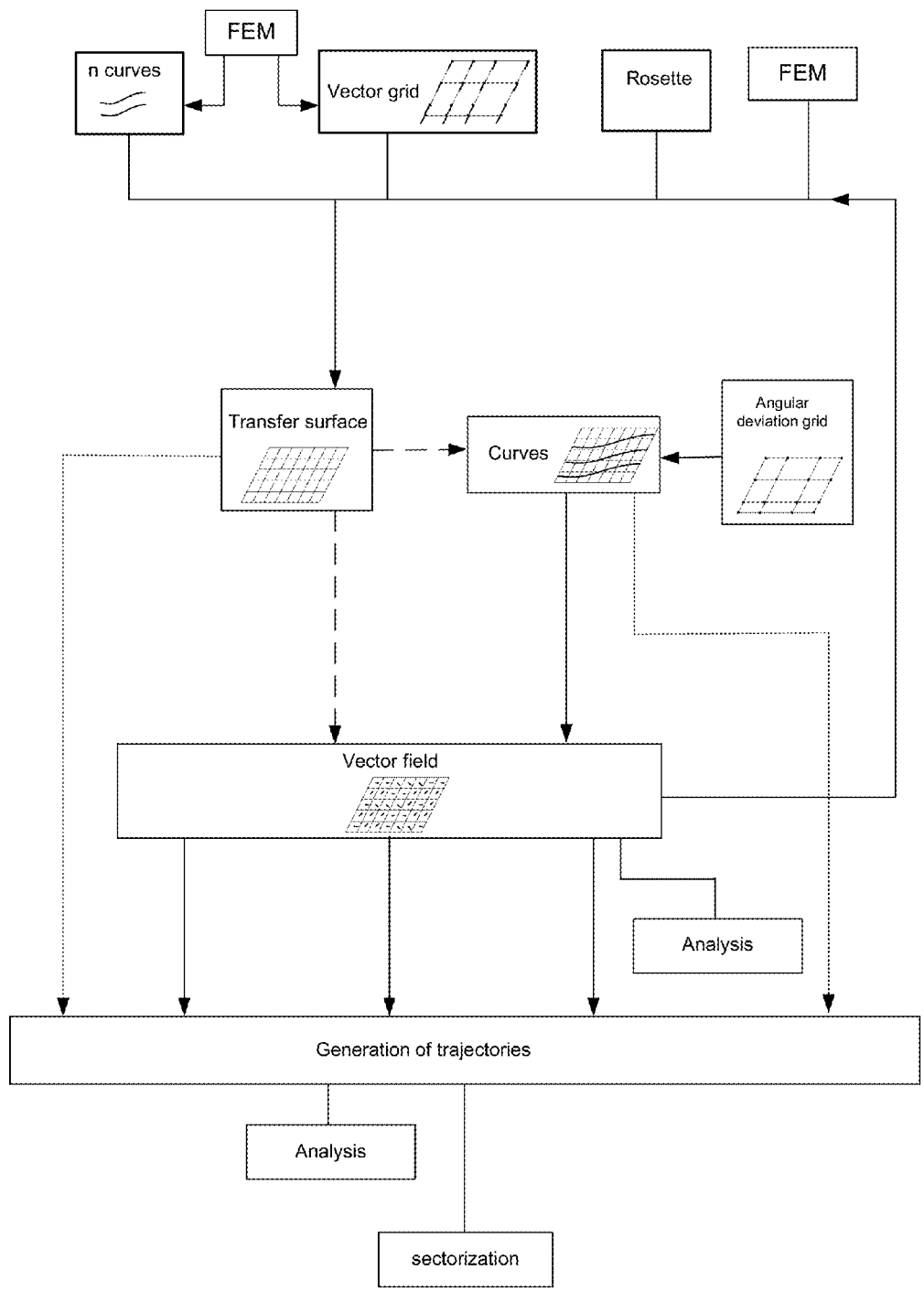
FIG. 1 is a general diagram illustrating different embodiments of the method according to the invention.

According to other embodiments, such as illustrated in FIG. 1, the vector field is obtained from a finite element mesh FEM, including direction data associated to each element, such as a FEM mesh coming from a design software, for example software marketed under the trade name NASTRAN, with at least one angle associated to each element, and a rosette associated to the mesh. This FEM mesh can be used directly as an input of the method according to the invention, or preferably be converted under the form of vector grid or constraint curves.

Furthermore, a vector field obtained according to the invention can be reintroduced as an input of the method according to the invention to obtain a new vector field.

Depending on the type of layup surface, different vector fields can be used for the definition of trajectories of the plies of different orientations. By way of example, with reference to FIG. 28, three different vector fields are defined:
  vector field for plies at 0°
  vector field for plies at 90°
  vector field for plies at +/−45°

The use of a vector field enables shear analyses to be performed quickly, in order to verify that the angle between the trajectories of different orientations are well within an acceptable range of values. Advantageously, as previously, the direction vectors of the vector fields are all defined for an orientation at 0°. In the case of the vector field for the plies at 90°, a 90° rotation of the direction vectors is performed to generate trajectories at 90°. Similarly, in the case of the field vectors for the plies at +/−45°, a rotation of more or less 45° of the direction vectors is performed to generate the trajectories at +45° or −45°. These different vector fields with the direction vectors defined for an orientation at 0°, allows a quick and easy comparison of the direction vectors for the shear analysis.

Although the invention has been described in conjunction with several specific embodiments, it is obvious that it is in no way limited thereto and includes all technical equivalents of the described means as well as their combinations if they are within the scope of the invention.

The invention claimed is:

1. A method for defining the trajectories of fiber on a layup surface for producing at least one ply having a given theoretical orientation, wherein the method includes:
  the definition of a finite element mesh of the layup surface;
  the definition of a transfer mesh of a transfer surface corresponding to a simplified surface, substantially continuous, of the layup surface, the direction of a fiber at an analysis point of an element of the layup surface, being obtained by
  the definition of a projected point by normal projection of an analysis point of said element mesh, on the transfer mesh,
  the definition of a reference direction at said projected point, from direction data associated to a method of transfer,
  the definition of the normal to the transfer mesh,
  the definition of a cutting plane, said cutting plane being defined by the projected point, said reference direction and said normal,
  the definition of the line of intersection of the cutting plane with the plane of said element mesh, the direction of the fiber at the analysis point being obtained from the direction of this line of intersection.

2. Method for the manufacture of parts made of composite materials by an automatic fiber layup machine, wherein the fiber trajectories for the laying up of plies by the layup machine are defined by the method according to claim 1.

* * * * *